United States Patent [19]

Chatterjee et al.

[11] Patent Number: 6,042,920
[45] Date of Patent: Mar. 28, 2000

[54] OPTICAL QUALITY COPOLYCARBONATES CONTAINING POLYOXYALKYLENE CARBONATE UNITS

[75] Inventors: Gautam Chatterjee, New Delhi, India; Joseph Anthony King, Jr., Midlothian, Va.; Donald George LeGrand, Burnt Hills, N.Y.; Godavarthi Satyanarayana Varadarajan, Dallas, Tex.

[73] Assignee: General Electric Company, Schenectady, N.Y.

[21] Appl. No.: 09/131,218

[22] Filed: Aug. 7, 1998

[51] Int. Cl.⁷ ...................................................... B32B 3/00
[52] U.S. Cl. ........................ 428/64.1; 428/64.4; 428/412; 428/913; 430/270.11; 430/495.1; 430/945; 369/288; 528/86; 528/193; 528/196; 528/204; 528/206; 528/219; 528/271
[58] Field of Search .................................. 428/64.1, 64.2, 428/64.4, 412, 913; 430/270.11, 495.1, 945; 369/288; 528/86, 193, 196, 204, 206, 271, 219

[56] References Cited

U.S. PATENT DOCUMENTS

| Re. 34,431 | 11/1993 | Brunelle et al. . | |
|---|---|---|---|
| 4,789,725 | 12/1988 | Guggenheim et al. . | |
| 5,859,833 | 1/1999 | Chatterjee et al. | 369/288 |
| 5,883,218 | 3/1999 | Gordon et al. | 528/202 |

FOREIGN PATENT DOCUMENTS

| 287887A2 | 10/1988 | European Pat. Off. . |
| 621297A2 | 10/1994 | European Pat. Off. . |
| 53544 | 2/1986 | Japan . |
| 149888 | 6/1995 | Japan . |

*Primary Examiner*—Elizabeth Evans
*Attorney, Agent, or Firm*—Noreen C. Johnson; Douglas E. Stoner

[57] ABSTRACT

Copolycarbonates comprise structural units derived from a bisphenol such as bisphenol A, a spiro(bis)indane bisphenol such as 6,6'-dihdyroxy-3,3,3',3'-tetramethyl-1,1'-spiro(bis) indane and a polyoxyalkylene glycol such as polyethylene glycol. These copolycarbonates have high processability and are expected to have low birefringence. They are useful for the fabrication of optical disks.

14 Claims, No Drawings

OPTICAL QUALITY COPOLYCARBONATES CONTAINING POLYOXYALKYLENE CARBONATE UNITS

BACKGROUND OF THE INVENTION

This invention relates to polycarbonate technology, and more particularly to the development of optical quality polycarbonates.

Optical data-recording media, including optical disks as exemplified by compact audio disks and CD-ROM disks used in computers, have become a major means of storing data and making it available. The data on an optical disk are read by a plane polarized laser beam and a polarization-sensitive detection scheme. For this reason, it is necessary to minimize polarization-dependent effects on these laser beams upon passage through the disk.

By far the most common polymers employed in optical disks are polycarbonates. They are peculiarly suited for this purpose by reason of their transparency and favorable physical properties.

In the further development of optical disks, particularly read-write disks and disks capable of storing larger amounts of data, various physical factors become important. One such factor, which is closely related to the storage capacity of the disk, is birefringence, i.e., the difference between indices of refraction for light polarized in perpendicular directions. Birefringence leads to phase retardation between different polarization components of the laser beam, thereby reducing readability.

Birefringence results from several sources, including the chemical nature of the raw material from which the disk is fabricated, the degree of molecular orientation therein and thermal stresses in a fabricated plastic optical disk. The observed birefringences of a disk are therefore determined by the molecular structure, which determines the intrinsic birefringence, and the processing conditions, which can create thermal stresses and orientation of the polymer chains.

It is known that bisphenol A polycarbonates, which are the principal ones currently being produced, are characterized by very high positive intrinsic birefringence, "bisphenol A" being the common name of 2,2-bis(4-hydroxyphenyl) propane. It is also known that homopolycarbonates comprising units derived from spiro(bis)indanes, especially 6,6'-dihdyroxy-3,3,3',3'-tetramethyl-1,1'-spiro(bis)indane, hereinafter designated "SBI", have negative intrinsic birefringences, owing to the molecular structure of the SBI unit and conformation in said homopolymers.

A class of copolycarbonates having low intrinsic birefringence is disclosed, for example, in U.S. Pat. No. 4,552,949. Said copolycarbonates comprise structural units derived from bisphenol A and SBI.

It is also known, however, that SBI polycarbonates are deficient in such areas as processability and ductility, as demonstrated, for example, by very high glass transition temperatures (Tg). One result is that molding of SBI polycarbonates, including both homopolycarbonates and copolycarbonates also containing bisphenol A units, induces severe stresses. This is particularly true of injection molding of optical disks, in which such stresses are magnified. Under such conditions, these stresses can induce significant birefringence in a disk, despite the low intrinsic birefringence of the SBI-containing polycarbonates.

A critical parameter in the performance of an optical disk is termed "vertical" birefringence (hereinafter "VBR"), which is defined as the difference between the refractive indices for light polarized perpendicular to the plane and that polarized in the plane of the disk. High VBR is a problem often encountered in disks molded from SBI polycarbonates in addition to the other processing difficulties. The physical properties accompanying such processing difficulties may include glass transition temperatures above 200° C. and high melt viscosities.

The vertical birefringence parameter is characteristic of optical disks specifically and cannot be related directly to polycarbonates in bulk. However, a related parameter which may be determined for a bulk polycarbonate is its stress optical coefficient in the glass phase, Cg. The Cg value for bisphenol A polycarbonate is 72, while that of a bisphenol A-SBI copolycarbonate containing 72 mole percent SBI units is 26.

It is of interest, therefore, to develop polycarbonates having both low Cg values and high processability and ductility.

SUMMARY OF THE INVENTION

The present invention is based on the discovery of a class of copolycarbonates which have the desired physical and are expected to have the desired optical properties. Said copolycarbonates contain bisphenol-derived, spiro(bis)indane-derived and polyoxyalkylene glycol-derived structural units. Also provided is a method for their preparation which involves melt reaction with staged monomer addition, and articles made from said copolycarbonates.

One aspect of the invention, therefore, is copolycarbonates comprising:

bisphenol carbonate structural units of the formula

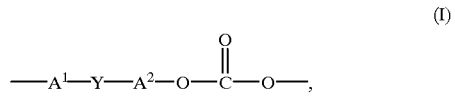

(I)

wherein each of $A^1$ and $A^2$ is a divalent aromatic radical and Y is a single bond or a bridging radical wherein one or two atoms separate $A^1$ from $A^2$;

polyoxyalkylene carbonate structural units of the formula

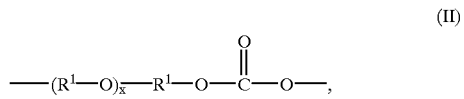

(II)

wherein each $R^1$ is independently a $C_{2-6}$ divalent aliphatic radical and x is in the range of about 2–50; and spiro(bis)indane carbonate structural units of the formula

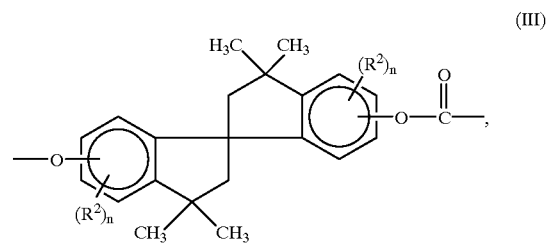

(III)

wherein $R^2$ is $C_{1-4}$ alkyl and n is 0 or 1;

said copolycarbonate comprising at least 4% by weight of units of formula II and at least about 10 mole percent of units of formula III.

Another aspect of the invention is a method for preparing a copolycarbonate as describe above which comprises:

(A) contacting, under melt polymerization conditions including temperatures in the range of about 170–230° C., at least one diaryl carbonate with at least one first bisphenol corresponding to the units of formula I in combination with at least one second bisphenol corresponding to the units of formula III; and (B) introducing at least one polyoxyalkylene glycol corresponding to the units of formula II and heating the resulting mixture at temperatures in the range of about 180–325° C.

Still another aspect of the invention is optical information storage media comprising a copolycarbonate as described above.

DETAILED DESCRIPTION; PREFERRED EMBODIMENTS

The bisphenol carbonate structural units of formula I in the copolycarbonates of this invention may be considered as derived from bisphenols of the formula HO—$A^1$—Y—$A^2$—OH. For example, $A^1$ and $A^2$ typically represent unsubstituted phenylene or substituted derivatives thereof. The bridging radical suitable as Y is most often a hydrocarbon group and particularly a saturated group such as methylene, cyclohexylidene or isopropylidene, although nonhydrocarbon groups such as oxygen, sulfur, sulfoxy or sulfone may be present. The most preferred bisphenol carbonate units are derived from bisphenol A, in which each of $A^1$ and $A^2$ is p-phenylene and Y is isopropylidene.

The polyoxyalkylene carbonate units of formula II are typically derived from polyoxyalkylene glycols in which the alkylene groups contain 2–6 and preferably 2–4 carbon atoms, such as polyethylene glycol and polypropylene glycol. The value of x is in the range of about 2–50, and most often such that the molecular weight of the structural unit of formula II is in the range of about 100–5,000. Those skilled in the art will recognize that employment of polyoxyalkylene glycols of higher molecular weight will permit the use of smaller weight percentages thereof to produce essentially equivalent effects on properties.

In the spiro(bis)indane carbonate units of formula III, the $R^2$ groups may be such lower alkyl radicals as methyl, ethyl, n-propyl or isopropyl. The preferred units, however, are SBI units in which each n is 0.

The copolycarbonates of the invention comprise at least 4% and preferably about 5–20% by weight of units of formula II and at least about 10 and preferably about 15–40% of units of formula III. It is in these preferred ranges that the most desired optical properties are believed to exist.

Said copolycarbonates cannot be prepared interfacially (i.e., by the reaction of phosgene with dihydroxy reagents in a mixed aqueous-organic system, under basic conditions) by reason of the relative lack of reactivity of polyoxyalkylene glycols under such conditions. They may, however, be prepared by a melt polymerization reaction between the corresponding bisphenols and polyoxyalkylene glycols and a diaryl carbonate, most often diphenyl carbonate. The second aspect of the invention is a preferred melt polymerization method in which the polyoxyalkylene glycol is introduced following the formation of an oligomer comprising units of formulas I and III, by melt polymerization of the bisphenols. This sequential polymerization procedure is believed to promote incorporation of units of formula II as single-unit rather than multi-unit blocks.

The preparation method may include the use of at least one transesterification catalyst. Suitable catalysts include many basic materials known in the art to be useful for this purpose, particularly alkali metal hydroxides, tetraalkylammonium hydroxides, tetraalkylphosphonium hydroxides and hexaalkylguanidinium bisphenolates of the type disclosed in U.S. Pat. No. 5,756,843, the disclosure of which is incorporated by reference herein. The latter are illustrated by the compound containing one hexaethylguanidinium cation, three protons and two bisphenol A dianions. It is frequently preferred to employ an alkali metal hydroxide such as sodium hydroxide in combination with a tetraalkylammonium hydroxide, tetraalkylphosphonium hydroxide or hexaalkylguanidinium bisphenolate.

In step A of the method of the invention, the reaction mixture comprising diaryl carbonate and bisphenols and, usually, catalyst is heated in an inert atmosphere such as nitrogen, with effective agitation such as stirring, at temperatures above about 170° C., the temperature being progressively increased until one or more values in the range of about 170–230° C. are attained. Reaction pressures are typically decreased with the increase in temperature.

In step B, the polyoxyalkylene glycol is introduced and heating is continued at temperatures in the range of about 180–325° C. The polycarbonate thus obtained may be isolated by conventional procedures.

An important expected characteristic of the copolycarbonates of the invention is their expected low Cg values. As previously noted, the Cg values for bisphenol A polycarbonate and an SBI-bisphenol A copolycarbonate containing 72 mole percent SBI units are 72 and 26, respectively. The value for a bisphenol A-polyethylene glycol (mol. wt. 400) copolycarbonate containing 5 mole percent polyethylene glycol units is 42. The copolycarbonates of the invention are expected to have values even lower than 42, and perhaps lower than 26.

Associated with the low Cg values of the copolycarbonates of the invention is their moldability into optical disks having low VBR. Disks molded from bisphenol A homopolycarbonates of comparable molecular weights typically have high VBR's.

Birefringence is determined from retardation, which is measured using a linearly polarized laser and a photoelastic modulator. The retardation in the polarization produced by an optical disk is analyzed using a detection scheme consisting of a linear polarizer and a lock-in amplifier. The retardation for light normally incident on a disk and that when the laser is incident at a known (non-normal) angle are used to determine the VBR.

The optical information storage media of the invention include such articles as audio disks, laser disks, optical disk memories and magnetoooptical disks to which information may be written and from which it may be read by laser. Such media may be produced from the copolycarbonates of the invention by art-recognized means.

The preparation of the copolycarbonates of the invention is illustrated by the following examples. All parts are by weight. Molecular weights were determined by gel permeation chromatography relative to polystyrene.

EXAMPLES 1–4

Glass melt polymerization reactors (1 l) were passivated by acid washing, rinsing and overnight drying at 70° C., and charged with various proportions of bisphenol A and SBI and with diphenyl carbonate, the latter being in a molar ratio of 2.4:1 based on total hydroxy reagents. Solid nickel helixing stirrers were suspended in the solid mixtures and the reactors were evacuated and purged three times with nitrogen.

The reactors were heated to 180° C. with stirring and were allowed to equilibrate for 5–10 minutes. There were then added, with continued stirring, 600 μl of a 0.221 M aqueous tetramethylammonium hydroxide solution and 500 μl of a 0.001 M aqueous sodium hydroxide solution. Heating at 180° C. was continued for 5 minutes, after which the temperature was increased to 210° C. and the pressure decreased to 180 torr, whereupon phenol began to distill from the mixtures.

After 25 minutes, the reactors were returned to atmospheric pressure by nitrogen gas introduction and then opened to the atmosphere, all at 210° C., and various amounts of a polyethylene glycol (PEG) were added to the reaction mixture via syringe. The reactors were resealed, allowed to equilibrate at 210° C. for 10 minutes. The pressure was decreased to 100 torr and heating at 210° C. was continued for 45 minutes. Polymerization was continued at 240° C./15 torr (45 minutes), 270° C./2 torr (100 minutes) and 300° C./0.2 torr (10 minutes). The polymers were then removed from the reactors, cooled, quenched with phosphorous acid in methylene chloride/methanol and dried. The results are given in the following table.

| Example | 1 | 2 | 3 | 4 |
|---|---|---|---|---|
| PEG MW | 200 | 200 | 400 | 400 |
| PEG mole % | 6.5 | 10 | 5 | 3 |
| SBI mole % | 18 | 30 | 35 | 18 |
| Bisphenol A mole % | 75.5 | 60 | 60 | 79 |
| Copolymer Mw | 26,600 | 27,100 | 33,600 | 38,600 |
| Copolymer Mn | 10,100 | 13,800 | 16,200 | 18,200 |
| Copolymer Tg, ° C. | 137 | 141 | 145 | 144 |

What is claimed is:

1. A copolycarbonate comprising:

bisphenol carbonate structural units of the formula

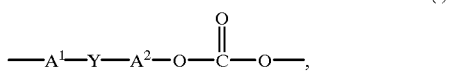

(I)

wherein each of $A^1$ and $A^2$ is a divalent aromatic radical and Y is a single bond or a bridging radical wherein one or two atoms separate $A^1$ from $A^2$;

polyoxyalkylene carbonate structural units of the formula

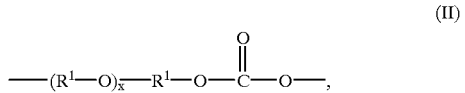

(II)

wherein each $R^1$ is independently a $C_{2-6}$ divalent aliphatic radical and x is in the range of about 2–50; and spiro(bis)indane carbonate structural units of the formula

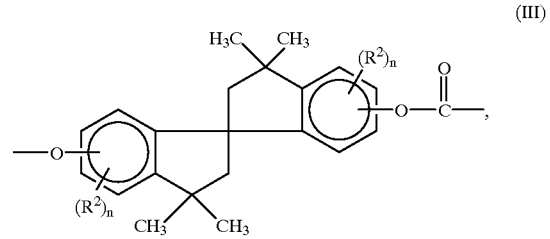

(III)

wherein $R^2$ is $C_{1-4}$ alkyl and n is 0 or 1;
said copolycarbonate comprising at least 4% by weight of units of formula II and at least about 10% of units of formula III.

2. A copolycarbonate according to claim 1 wherein each of $A^1$ and $A^2$ is p-phenylene and Y is isopropylidene.

3. A copolycarbonate according to claim 1 wherein n is 0.

4. A copolycarbonate according to claim 1 wherein each $R^1$ is ethylene.

5. A copolycarbonate according to claim 4 wherein the value of x is such that the molecular weight of the structural unit of formula II is in the range of about 100–5,000.

6. A copolycarbonate according to claim 1 which comprises about 5–20 mole percent of units of formula II and at least about 15–40 mole percent of units of formula III.

7. A method for preparing a copolycarbonate according to claim 1 which comprises:

(A) contacting, under melt polymerization conditions including temperatures in the range of about 170–230° C., at least one diaryl carbonate with at least one first bisphenol corresponding to the units of formula I in combination with at least one second bisphenol corresponding to the units of formula III; and (B) introducing at least one polyoxyalkylene glycol corresponding to the units of formula II and heating the resulting mixture at temperatures in the range of about 180–325° C.

8. A method according to claim 7 wherein the diaryl carbonate is diphenyl carbonate.

9. A method according to claim 8 wherein the first bisphenol is bisphenol A.

10. A method according to claim 8 wherein the second bisphenol is 6,6'-dihdyroxy-3,3,3',3'-tetramethyl-1,1'-spiro(bis)indane.

11. A method according to claim 8 wherein the polyoxyalkylene glycol is polyethylene glycol.

12. A method according to claim 8 wherein at least one transesterification catalyst is present.

13. A method according to claim 12 wherein the transesterification catalyst is a combination of an alkali metal hydroxide with a tetraalkylammonium hydroxide, tetraalkylphosphonium hydroxide or hexaalkylguanidinium bisphenolate.

14. An optical information storage medium comprising a copolycarbonate according to claim 1.

* * * * *